Aug. 6, 1929.  E. EISENBEISS  1,723,339
WASHBOILER
Filed March 25, 1927
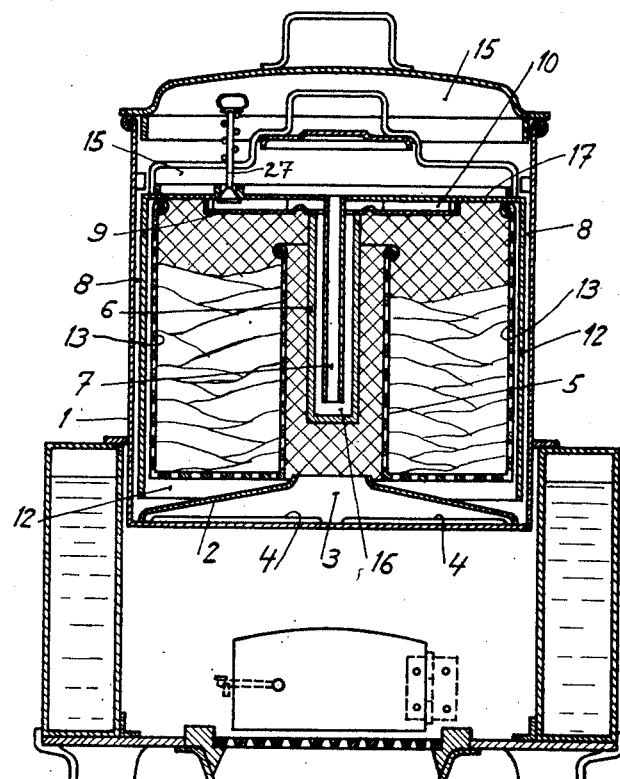
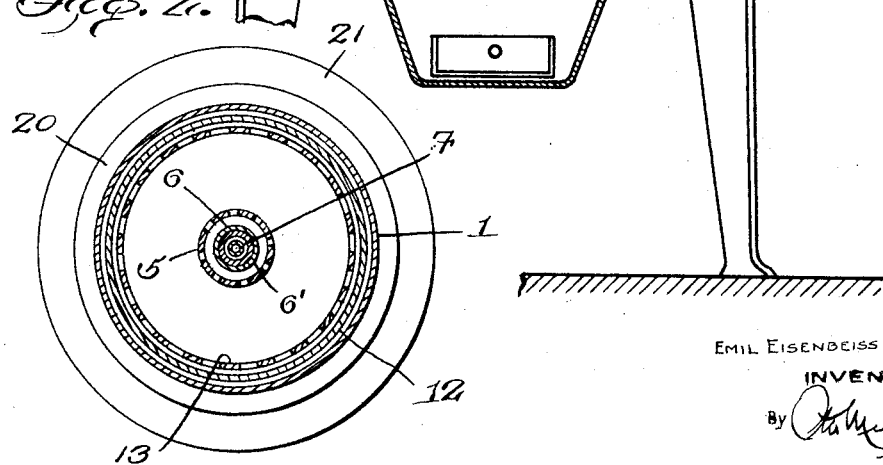
EMIL EISENBEISS
INVENTOR
By
his Attorney Patented Aug. 6, 1929.

1,723,339

UNITED STATES PATENT OFFICE.

EMIL EISENBEISS, OF AARAU, SWITZERLAND.

WASHBOILER.

Application filed March 25, 1927, Serial No. 178,231, and in Germany July 22, 1926.

The present invention relates to a new and improved apparatus to treat solid material with liquids, to treat textile goods with water for washing and rinsing purposes.

The invention relates more particularly to an apparatus of the said class in which a pulsating movement is imparted to liquids the latter being driven periodically in alternating directions through a chamber containing the goods to be treated.

The main object of the invention consists in the provision of the means to impart the pulsating movement to liquids within the working chamber itself and in the construction of said means in such a manner that the pulsating movement occurs most regularly and at short intervals of time across the goods to be treated.

A further object consists in the provision of means to ensure the automatic action of the apparatus the automatic reversal of the direction of flow of liquids through the working chamber and through the goods contained therein.

A still further object of the invention is to provide means to create a flow of liquids independent of the said pulsating movement across the said chamber the liquids having to pass through the goods in said chamber.

With these and other objects in view the invention resides in the function, combination and arrangement of parts which will be best understood and appreciated from the following description of a preferred embodiment thereof.

In the accompanying drawings the preferred construction of the apparatus is shown in a diagrammatical manner in a sectional elevation in Figure 1 and Figure 2 is a transverse sectional view taken on lines 2—2 of Figure 1.

The apparatus shown comprises a closed bottomed cylindrical vessel 1 adapted to contain liquid. The vessel 1 is placed above a grate in a suitable stand which itself forms no part of the invention and which may be made in any convenient manner. The vessel 1 is closed by a lid. On the bottom of the vessel 1 rests a dome 2. The dome 2 is of sheet metal, and is provided at its outer circumference with a downwardly projecting flange or rim in which holes or slots 4 are arranged. The dome 2 is further provided with a central aperture 3. Above the dome 2 a bell 12 is submerged in the liquid and within said bell 12 a cage or container 13 is arranged, adapted to receive the clothes to be treated. The walls of the cage 13 are of sheet metal and are provided with holes 13ª, or they may consist of other perforated construction. The diameter of the bell 12 is rather less than the diameter of the vessel 1, an annular space 8 is left between said parts 1 and 12 surrounding the bell 12 and allowing the passage of liquids. The cage 13 has a central cylinder 5, which is perforated; 7 is a tube leading from below the top 17 of the interior of the bell 12 to the space 15 above said bell. The lower end of the tube 7 dips into and is sealed by water contained in an upwardly directed cup 6. The said cup 6 which is closed at its lower end is fastened at its upper end to a circular disk 9, being provided with an opening 9ª communicating with the interior of the cup 6 and having an upwardly directed rim at its outer edge. In said rim holes or slots 10 are arranged to communicate with the interior of the bell 12. The cup 6 is surrounded by heat insulating material 6 such as cork etc. The diameters of tube 7 and of cup 6 are such that a passage 16 is formed through which the water passes freely from the space 15 to the interior of the working space or chamber 18. The outer edge of the top 17 of the bell 12 is slightly raised by an annular collar 19 above the centre where the tube 7 is connected in such a manner that sufficient water is retained to fill the water seal as and for the purpose described hereinafter.

According to the embodiment of my invention illustrated in the drawing, the vessel 1 is provided with a flange 20, which is disposed adjacent the lower end thereof, and which rests upon a water jacket 21 in the form of an annular chamber projecting upwardly from a grate supporting platform 22. The space within the inner annular wall of the water jacket 21, provides the heating chamber for the vessel 1 and communication with the space is made through a door 23. A grate 24 is supported centrally of the platform 22 and a depending pit 25 is disposed beneath the grate. A pan 26 is slidable in the pit to form a collection receptacle directly under the grate.

On heat being applied to the bottom of the vessel 1 the water therein will flow upwards through the aperture 3, water being drawn in through the slots 4. The water passes through the cage 13 and through the goods placed therein, an effective uninterrupted circulation of the water occurs. Further heat being applied the water in the vessel 1 within the working chamber will eventually boil and the steam therefrom will accumulate beneath the bell 12. The steam under pressure will gradually depress the level of the water in the bell 12 and in the cage 13. The water ejected from the bell flows through the annular space 8 and through the tube 7 into the space 15 above the bell 12. At the same time as the level of the water is depressed within the bell 12 the level of the water in the cup 6 is also depressed by the increasing steam pressure in the working chamber 18. As soon as the lower end of the tube 7 is uncovered steam will blow out through the tube 7 ejecting the water therein. Steam passes into the space 15, thus the accumulated pressure in the bell 12 will be relieved and the level of the water in the space 15 being no longer sustained will fall through the annular passage 8. The water periodically rises and falls and a regular pulsation of a great amplitude is obtained by automatically working means. Besides this pulsation a regular circulation of the water is effected by the dome 2, the water flowing through the openings 4 into the dome 2 rises after being heated through the aperture 3. While the steam generated accumulates in the bell the water passes through the perforated walls of the cage 13 on to the clothes. The upper extension 9 of the cup 6 prevents the rising water which contains steam bubbles from passing into the tube 7. If such highly heated water would enter the said tube 7, steam would escape too early and the periodical function of the apparatus would not be attained. The insulation on the cup 6 prevents the water in the seal 6, 7 from being heated to such an extent that the automatic function of the apparatus would be interfered with. To make sure that the seal 6, 7 is being supplied with water the outer edge of the wall 17 of the bell is raised by an annular collar 19 to prevent some of the water in the space 15 from flowing down through the annular space 8.

A valve 27 is provided in the top 17 of the bell 12 so as to provide manually operated means to establish communication between the chambers 10 and 15. The valve 27 is spring supported and in the event of an excess of steam in chamber 15, the pressure will be exerted against the valve which will open to permit escape into the space 10.

Other modes of applying the principle of my invention may be employed instead of the one explained and I do not wish to limit my invention to the particular means as shown and described except as limited by the claims.

What I wish to secure by United States Letters Patent is:—

1. In an apparatus for treating solid bodies with liquids to which a pulsating movement is imparted, the combination of a heated vessel, a bell open at the lower end arranged within said vessel, forming a passage for the liquid between the side walls of the vessel and of the bell said passage interconnecting the space beneath the bell with a space above said bell, a cage adapted to receive the goods to be treated, arranged within the bell, a central cylinder in said cage, a tube projecting into said cylinder fixed to the top of the bell, and insulated means surrounding the said tube to form a liquid seal closing the lower end of the tube.

2. In an apparatus for treating solid bodies with liquids to which a pulsating movement is imparted the combination of a heated vessel, a bell open at the lower end and arranged within said vessel forming a passage for the liquid between the side walls of the vessel and of the bell, said passage interconnecting the space beneath the bell with a space above said bell, a cage adapted to receive the goods to be treated arranged within the bell, a central cylinder in said cage, a tube open at both ends projecting into said cylinder fixed to the top of the bell, a cup surrounding said tube and forming a liquid seal closing the said tube, a flanged extension on said cup arranged at the interior of the bell and near the top of the bell having openings in the rim thereof communicating with the interior of the cage, an insulation on said cup, a dome resting on the bottom of the vessel having an opening at its circumferential rim and a central aperture substantially as described.

In witness whereof I affix my signature.

EMIL EISENBEISS.